United States Patent
Shamis et al.

(10) Patent No.: US 10,733,106 B2
(45) Date of Patent: Aug. 4, 2020

(54) I/O DRIVEN DATA ROUTING AND CACHE ALLOCATION

(71) Applicant: ARM LTD, Cambridge (GB)

(72) Inventors: Pavel Shamis, Austin, TX (US); Alejandro Rico Carro, Austin, TX (US)

(73) Assignee: ARM LTD, Cambridge (GB)

( * ) Notice: Subject to any disclaimer, the term of this patent is extended or adjusted under 35 U.S.C. 154(b) by 1 day.

(21) Appl. No.: 15/801,995

(22) Filed: Nov. 2, 2017

(65) Prior Publication Data

US 2019/0129857 A1    May 2, 2019

(51) Int. Cl.
| | |
|---|---|
| *G06F 12/0871* | (2016.01) |
| *G06F 12/0811* | (2016.01) |
| *G06F 3/06* | (2006.01) |
| *G06F 12/128* | (2016.01) |
| *G06F 12/0815* | (2016.01) |
| *G06F 12/0817* | (2016.01) |
| *G06F 12/0813* | (2016.01) |
| *G06F 12/123* | (2016.01) |
| *G06F 12/084* | (2016.01) |

(52) U.S. Cl.
CPC .......... *G06F 12/0871* (2013.01); *G06F 3/061* (2013.01); *G06F 3/0631* (2013.01); *G06F 3/0635* (2013.01); *G06F 3/0655* (2013.01); *G06F 3/0685* (2013.01); *G06F 12/0811* (2013.01); *G06F 12/0813* (2013.01); *G06F 12/0815* (2013.01); *G06F 12/0824* (2013.01); *G06F 12/128* (2013.01); *G06F 12/084* (2013.01); *G06F 12/123* (2013.01); *G06F 2212/1044* (2013.01); *G06F 2212/154* (2013.01); *G06F 2212/283* (2013.01); *G06F 2212/604* (2013.01); *G06F 2212/621* (2013.01)

(58) Field of Classification Search
CPC ......... H04L 49/90; H04L 69/22; G06F 9/546; G06F 2209/548
USPC ..... 370/412, 392, 389, 474; 710/40, 52, 268
See application file for complete search history.

(56) References Cited

U.S. PATENT DOCUMENTS

| | | | | |
|---|---|---|---|---|
| 6,643,710 | B1* | 11/2003 | Thorne | H04L 69/16 709/225 |
| 8,170,041 | B1* | 5/2012 | Underwood | G06F 13/385 370/229 |
| 2008/0162760 | A1* | 7/2008 | Jacob | G06F 13/1642 710/244 |
| 2010/0232448 | A1* | 9/2010 | Sugumar | G06F 15/17337 370/412 |
| 2011/0265098 | A1* | 10/2011 | Dozsa | G06F 9/546 719/314 |

(Continued)

*Primary Examiner* — Faisal M Zaman
(74) *Attorney, Agent, or Firm* — Leveque IP Law, P.C.

(57) ABSTRACT

A method and apparatus are provided for automatic routing of messages in a data processing system. An incoming message at an input/output (I/O) interface of the data processing system includes a message identifier and payload data. Match information, including an indicator or whether the message identifier of the incoming message matches an identifier of a request in a receive queue (RQ), is used to determine a destination for the incoming message. The incoming message is forwarded to the determined destination. Information, such as payload size and RQ position, may be used to determine allocation of the payload within a cache or cache hierarchy.

20 Claims, 5 Drawing Sheets

(56) References Cited

U.S. PATENT DOCUMENTS

| | | |
|---|---|---|
| 2013/0219410 A1 | 8/2013 | Archer et al. |
| 2013/0290656 A1* | 10/2013 | Staelin .................... G06F 13/18 |
| | | 711/158 |
| 2015/0058858 A1* | 2/2015 | Plattner ................. G06F 9/4881 |
| | | 718/103 |
| 2015/0143053 A1 | 5/2015 | Quimbey et al. |
| 2015/0227312 A1* | 8/2015 | Feehrer ................... G06F 3/061 |
| | | 710/22 |
| 2017/0039144 A1 | 2/2017 | Wang et al. |
| 2017/0094010 A1 | 3/2017 | Dinan et al. |
| 2017/0163662 A1 | 6/2017 | Zhou et al. |
| 2019/0102236 A1* | 4/2019 | Sur ......................... G06F 9/544 |
| 2019/0102301 A1* | 4/2019 | Li ........................ G06F 12/0831 |

\* cited by examiner

I/O DRIVEN DATA ROUTING AND CACHE ALLOCATION

BACKGROUND

In a data processing system, data may be received or transmitted via an input/output (I/O) interface. This may be an I/O controller interface to an off-chip data resource or a network interface controller (NIC) to a resource of a local or remote network.

When data is received from an I/O interface it is directed to a storage resource of the data processing system. Selection of which storage is to be used may be controlled by software or hardware configuration of the data processing system. However, this approach is not optimal since the usage of the received data is difficult to predict. As a result, data directed to a memory device may need to be moved at once to a processor cache for use, resulting in additional memory transfers, while data stored directly in a cache, via a cache stashing mechanism for example, may not be needed, wasting cache space and requiring additional memory transfers to evict the data back to memory.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. In these drawings, like reference numerals identify corresponding elements.

DETAILED DESCRIPTION

Figure 1:
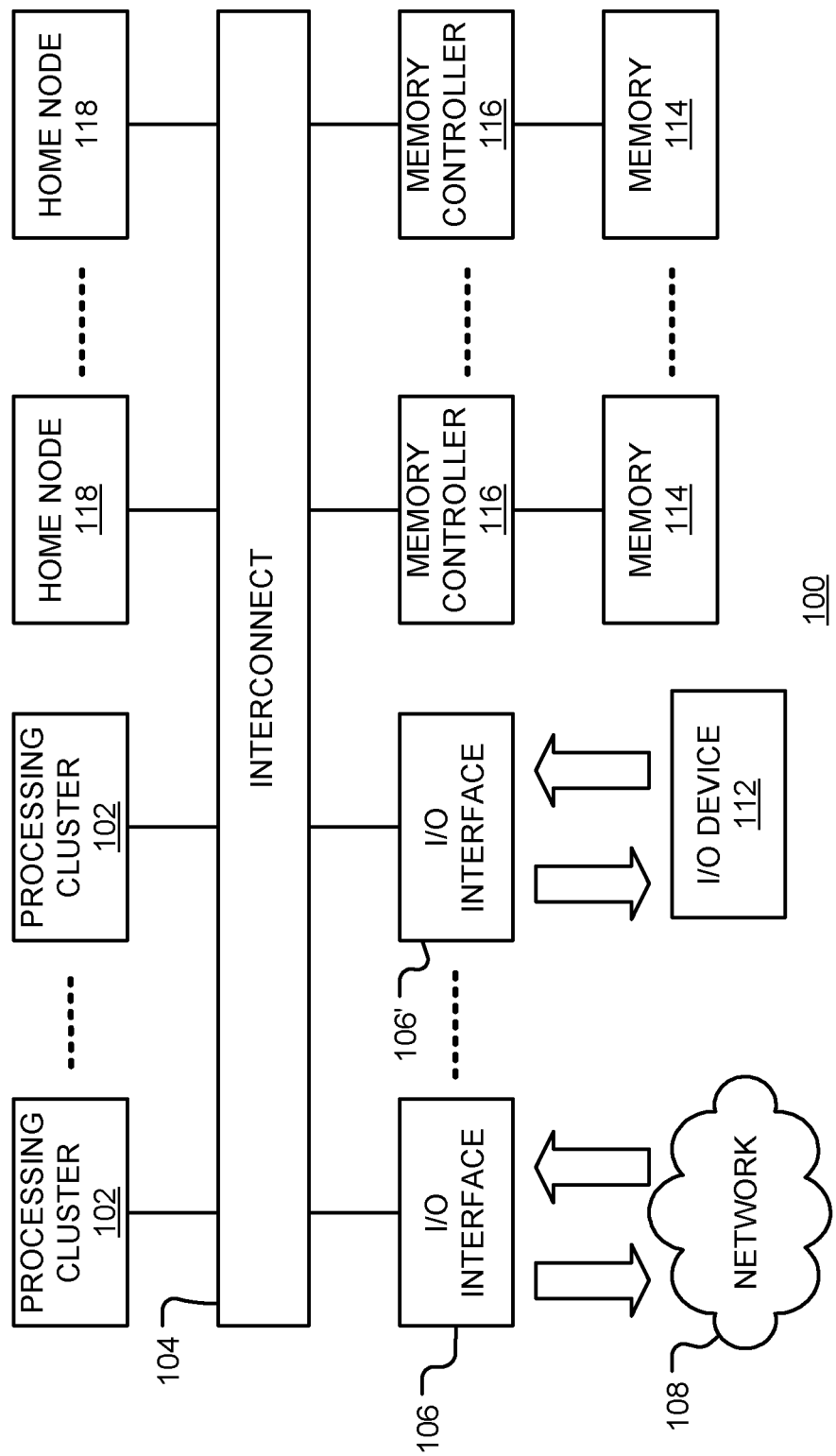
FIG. 1 is a block diagram of a data processing system, in accordance with various representative embodiments.

The various apparatus and devices described herein provide mechanisms for automatic routing and allocation of incoming data in a data processing system.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The present disclosure relates to a mechanism in a data processing system that automatically determines the destination of data received at an input/output (I/O) interface. For example, data may be allocated to a cache or a memory of the data processing system.

The disclosure will be described with reference to a multi-core architecture with a cache coherent interconnect (CCI) that connects a set of processing core clusters, a set of home nodes (HN) including a system level cache (SLC) shared across all cores, a set of memory controllers and I/O device interfaces. In general, the data processing system includes a plurality of data storage resources, such as caches and memories.

FIG. 1 is a block diagram of a data processing system 100, in accordance with various representative embodiments. A number of processing core clusters 102 are coupled to data resources via cache coherent interconnect (CCI) 104. Data is received via input/output (I/O) interfaces. In the example shown, I/O interface 106 comprises a network interface controller (NCI) that receives data from network 108 and I/O interface 106' receives data from I/O device 112. Data may be stored in one or more memory or storage devices 114 that are coupled to interconnect 104 via memory controllers 116. Home nodes (HN) 118 include system level caches. Each home node (HN) serves as a point of coherence for data stored at a given system address. Data received from I/O interfaces 106 and 106' may be routed to a home node. The home node then stored the data in a system level cache of the HN or sends it to a memory controller 116 for storing in a memory 114. Alternatively, using a process referred to as 'cache stashing', data received at I/O interfaces 106 and 106' may be routed to a cache of a processing cluster 102. Cache stashing is the mechanism through which an I/O interface can write data to a core private caches (L1, L2) or cluster cache (L3) of a processing cluster.

In prior data processing systems, the destination for data received at an I/O interface is determined by user programming instructions, software configuration or hardware configuration. However, this approach is not optimal since the usage of the received data is difficult to predict. As a result, data directed to a memory device may need to be moved at once to a processor cache for use, resulting in additional memory transfers, while data stored directly in a cache, via a cache stashing mechanism for example, may not be needed, wasting cache space and requiring additional memory transfers to evict the data back to memory.

In accordance with an aspect of the disclosure, a mechanism is provided for automatically deciding if a particular message should enable/disable cache stashing for the message. When cache stashing is disabled, particular message attributes are used to influence the cache allocation policy in the system level cache. The decision may be based on message attributes (tags, source address, payload size etc.) and the status of I/O message queues.

Figure 2:
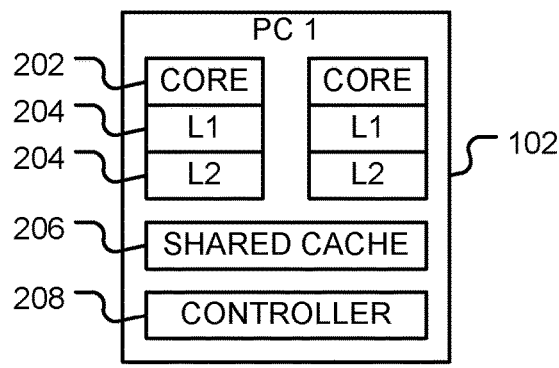
FIG. 2 is a block diagram of processing cluster, in accordance with various representative embodiments.

FIG. 2 is a block diagram of processing cluster 102, in accordance with various representative embodiments. The processing cluster 102 includes one or more processing cores 202, one or more core-private caches 204 for each core, and a cluster-private cache 206 that is shared between processing cores. For example, core-private caches 204 may comprise L1 and L2 caches, as shown, and cluster-private cache 206 may be an L3 cache. Movement of data in and out of the caches is controlled by cache controller 208. Cache controller 208 also provides a stashing mechanism that allows an I/O interface to write data directly into the core-private or cluster-private caches of a requesting processing cluster.

Figure 3:
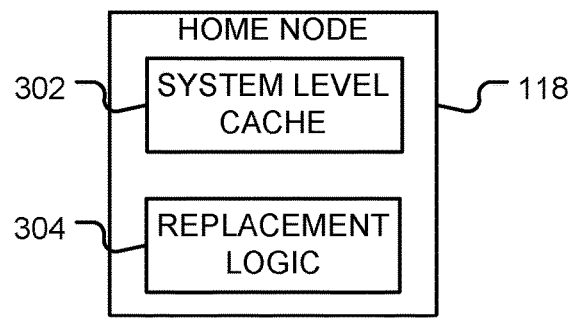
FIG. 3 is a block diagram of a home node, in accordance with various representative embodiments.

FIG. 3 is a block diagram of a home node (HN) 118, in accordance with various representative embodiments. The home node 118 serves as a point of coherence for data stored in a system level cache 302. Movement of data in and out of the cache is controlled by replacement logic 304. For example, the replacement logic may keep track of which cache lines are most recently used (MRU) and which are least recently used (LRU). The logic may include an address or tag stack, for example. The home node may also include other elements, such as a snoop filter and a snoop controller to enable coherence management. When cache stashing is disabled for a message, the data is sent to the HN which decides whether to allocate the data into the SLC or bypass it to memory depending on the value of an 'allocate' attribute of the message which can be true of false. In the case of allocation in the cache, the I-IN can also decide where in the least-recently-used (LRU) stack the data is inserted based on the value of a 'priority' attribute of the message.

Figure 4:
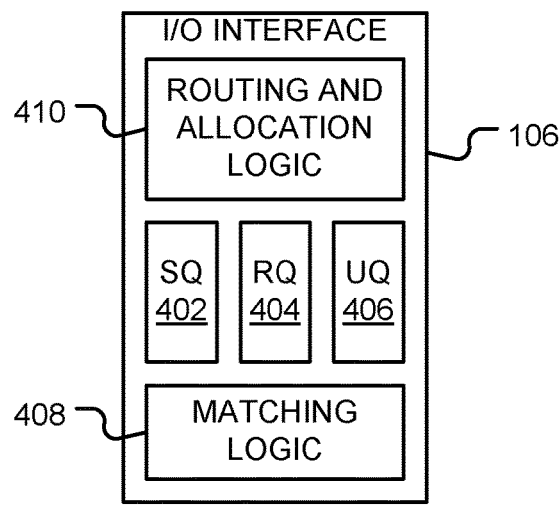
FIG. 4 is a block diagram of an input/output (I/O) interface, in accordance with various representative embodiments.

FIG. 4 is a block diagram of an input/output (I/O) interface 106, in accordance with various representative embodiments. I/O interface 106 operates in accordance with message queuing protocol, and includes a message send queue (SQ) 402, a message receive queue (RQ) 404 and an unexpected queue (UQ) 406 for unexpected messages. In other embodiments, such as with a virtual local area network (VLAN) or a software defined network (SDN), the receive queue may be implemented as a matching table. In a receive queue, each incoming message is matched to entry in the queue. When a match is found, the entry is removed from the receive queue. In contrast, with a matching table, the incoming message is matched against an entry in the table, but the entry itself is not removed until an explicit instruction to remove is issued. The embodiments below are described with respect to a receive queue. However, in general any structure for storing receive requests may be used. Herein, the term 'receive queue' is taken to include all such structures including, but not limited to, queues, tables and other structures.

In one embodiment, the message queueing protocol implements the Message Passing Interface (MPI) and programming model. MPI is a de-facto standard that provides a programming model and communication services for high-performance computing (HPC) applications including scientific simulations, big-data, machine learning and analytics. However, the mechanism disclosed here is not limited to HPC or MPI. Other message schemes that utilize queues and tag matching logic may be used. For example, I/O mechanisms based on queue constructs, such as Quality of Service (QoS), Virtual Local Area Networks (VLANs), and Software Defined Networking (SDN) technologies may be used. Each one of these technologies associate a tag (or any other message identifying attribute) on the sender side and utilizes a receive queue (RQ). Matching logic 408 matches sent and requested messages based on the rules defined by the underlying technology.

MPI is an abstract communication framework that defines point-to-point send-receive communication semantics that are used for communication between processing elements (PEs) or other devices. The send-receive semantics are realized in hardware in I/O interface 106 using send queue (SQ) 402 and receive queue (RQ) 404. In order to send a message, a processing element (PE) posts a send request to the SQ. In order to receive a message, a PE posts a request to the RQ. Each send and receive request can be associated with a tag, which is the message identifier. In addition, each request is associated with a virtual address (or vector), which is a reference to the data payload. When message comes from a network, matching logic 408 compares the tag of the incoming message to the tags associated with requests in RQ 404. If the incoming tag matches one of the requests, it means that the application waits (or expects) on the message. If a request with matching tag cannot be found in RQ 404, the incoming message is redirect to unexpected queue (UQ) 406. UQ 406 manages incoming messages that the application is not ready to receive.

In accordance with the present disclosure, routing and allocation logic 410 is provided for automatic routing of data received at an I/O interface. Routing and allocation logic 410 may be implemented as a component of I/O interface 106 (as shown) or may be a separate module. Routing and allocation logic 410 provides a mechanism that connects the SQ, RQ, UQ and I/O message matching logic (based on tag or any other attribute identifying the message) to on-chip CCI stash caching and allocation logic to provide automatic routing of data.

Figure 5:
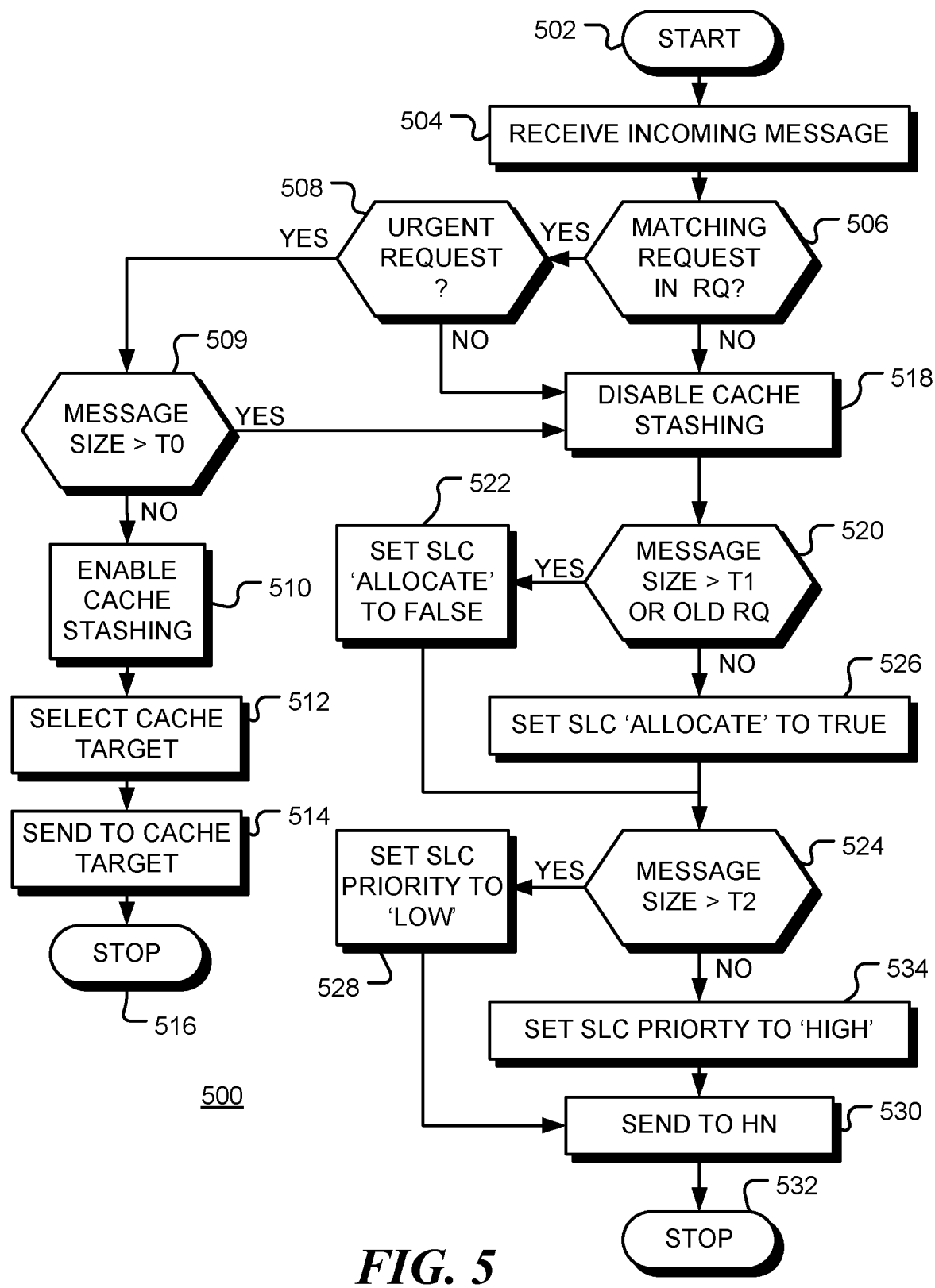
FIG. 5 is a flow chart of a method for automatic routing of data received at an I/O interface of data processing system, in accordance with various representative embodiments of the disclosure.

FIG. 5 is a flow chart of a method 500 for automatic routing of data received at an I/O interface of data processing system, in accordance with embodiments of the disclosure. The method may be implemented in dedicated hardware, in software configured hardware, in software, or in a combination of these. Following start block 502, an incoming message is received from a network or I/O device at block 504. If a matching request is found in the receive queue (RQ), as indicated by the positive branch from decision block 506, it may be appropriate for the routing and allocation logic to enable cache stashing. For a messaging protocol that employs ordering rules based on the message tag attribute, the location of the matching request in the RQ is used to determine if the request was urgent or not. If the incoming message arrives out of order, which means that the matching receive tag is located relatively far from the head of the queue (as defined by a selected threshold) in the receive queue, then message is determined not to be urgent and the cache-stashing mechanism can be disabled, as depicted by the negative branch from decision block 508. This prevents pollution of the core-private and cluster-private caches by out-of-order messages. However, if the request is judged to be urgent (e.g. near the head of the queue), or if no ordering rules are used, as depicted by the positive branch from decision block 508, flow continues to block 509. Cache stashing is also disabled when the message size is too large, as depicted by the positive branch from decision block 509. For example, the message size may be compared to a threshold T0 and cache stashing may be disabled to avoid overflow of private caches. If the message size is not too large, as depicted by the negative branch from decision block 509, cache stashing is enabled at block 510. Enabling the cache stashing mechanism of the interconnect accelerates application access to the incoming data. Optionally, at block 512, the queue depth is also used to select the cache stashing target. Between the head of the queue and the queue depth threshold used to disable cache stashing, other thresholds may be used to select whether to stash the payload data in an L1, L2 or L3 cache. Locations closer to the head of the queue could be targeted to caches closer to the core. This enables messages that are expected to be read by the program sooner to be stashed closer to the core. The data is sent to target cache location at block 514 using the cache stashing mechanism of the interconnect and the method terminates at block 516.

If no matching request is found in the receive queue (RQ), as indicated by the negative branch from decision block 506, the incoming message is stored (enqueued) to the UQ. This indicates that the application does not anticipate the message and, therefore, cache stashing is disabled at block 518. Cache stashing may also be disabled at block 518 if the received message matches an out of order request deep in the RQ, as indicated by the negative branch from decision block 508. At decision block 520 it is determined whether or not the data should be targeted to the system level cache (SLC) of a home node (HN). For example, if the size of the payload data is beyond a certain size threshold T1, allocation into the SLC is disabled to prevent pollution of the SLC. Also, if the message is received out of order and the match request is deep in the RQ (indicating a less urgent message), allocation in the SLC is disabled.

As indicated by the positive branch from decision block 520, allocation in the SLC is disabled at block 522 by setting an 'allocate' attribute of the message to 'false' and flow continues to block 524. For smaller messages that match more urgent requests, the 'allocate' attribute of the message is set to 'true' at block 526. At decision block 524, it is determined if allocation in the SLC should be given a low priority or a high priority. The priority value could be set, for example, based on the message size or the position of the matching request in the receive queue (which is an indication of the message urgency). Thus, for example, if the message size is above a size threshold T2, as depicted by the positive branch from decision block 524, the priority attribute of the message is set to 'low' at block 528 and flow continues to block 530. If the message size is below the size threshold T2, as depicted by the negative branch from decision block 524, the priority attribute of the message is set to 'high' at block 534. At block 530 the message with its 'allocate' and 'priority' attributes, is sent to the home node (HN) and the process terminates at block 532. Additionally, if the queue depth of the matching message is closer to the head of RQ, the message is judged to be more urgent and is given a higher priority to indicate that the data should be inserted closer to the most-recently-used position (MRU) in the SLC. Queue depth closer to the tail of the RQ would have a lower priority and the data would be inserted closer to the LRU position. The 'priority' attribute may be a numerical value or a binary (high/low) value.

On receipt of the message and its attributes, the HN may insert data with a low 'priority' into the middle of the cache set. In this way, if the message is large, it would only pollute data with a lower recently used (LRU) position in the LRU stack. This would limit pollution of the SLC to a given subset of its entire capacity.

The method described above provides a number of advantages, including:
(a) Acceleration of the data access by cache stashing of the incoming data anticipated by the application; and
(b) Mitigation of the pollution of core-private or cluster-private caches by avoidance of the cache stashing or reducing priority for unexpected messages.

The method has been described above with reference to a cache stashing mechanism. However, the method may also be used in systems that employ scratchpad memories to decide if an incoming message has to be placed in scratchpad memory, which is close to a compute core, or a slower (or lower priority) memory.

Figure 6:
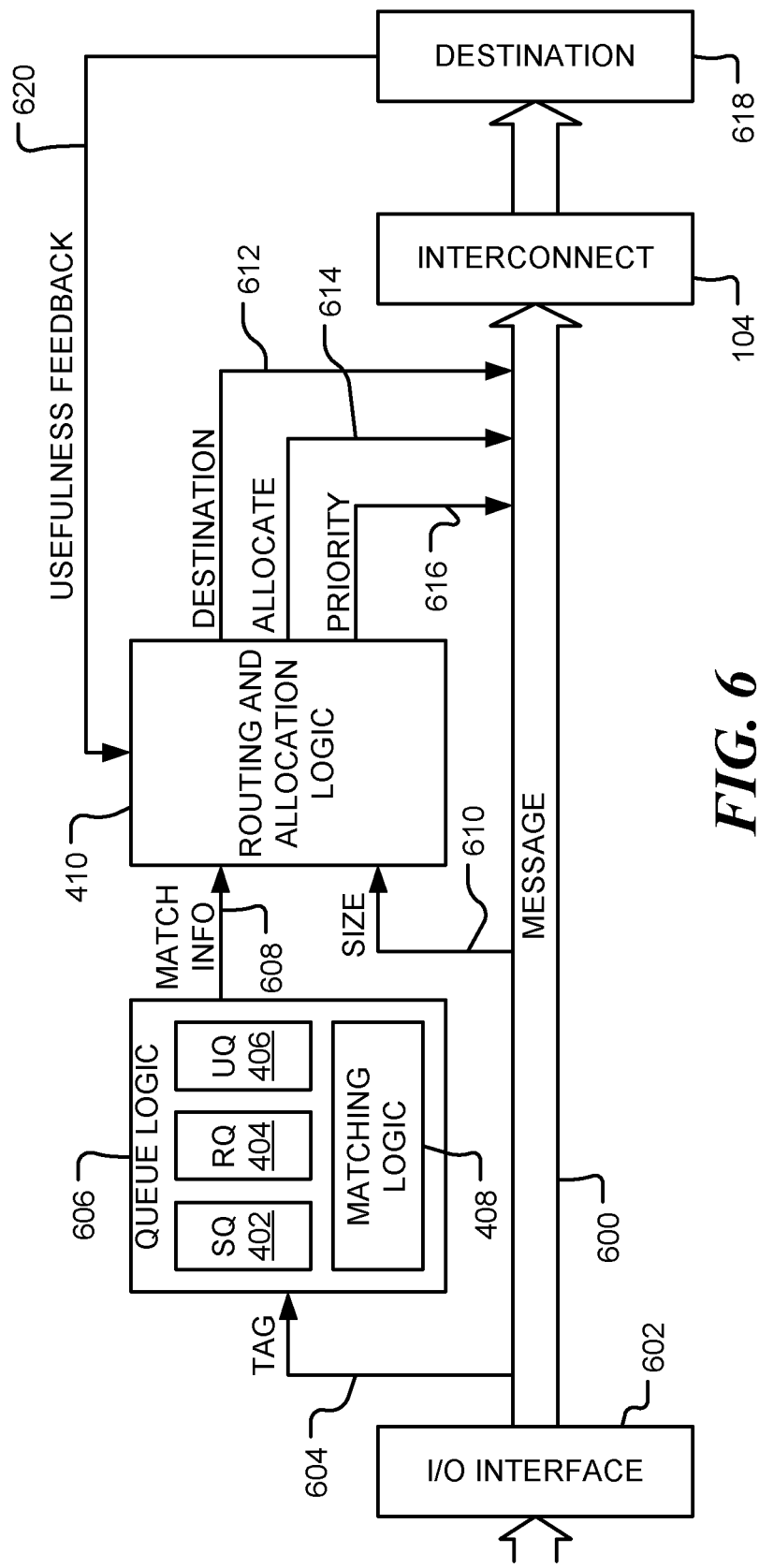
FIG. 6 is a diagrammatic representation of information flow in a data processing system, consistent with various embodiments of the disclosure.

FIG. 6 is a diagrammatic representation of information flow in a data processing system, consistent with various embodiments of the disclosure. Message 600 is received at an I/O interface 602 of a data processing system. The message may be received from a network or an I/O device, for example. The message includes a tag or other message identifier 604 that is passed to queue logic 606. Matching logic 408 determines if the tag matches a request stored in receive queue (RQ) 404 and outputs associated match information 608. The match information indicates if a match was found and may also indicate where in the RQ the matching request was located. Queue information 608 is passed to routing and allocation logic 410, together with size information 610 from the message 600. From the queue information 608 and size information 610, the routing and allocation logic 410 determines the destination 612 for the message (e.g. a cache of a processing element or a home node), an 'allocate' attribute 614 that indicates whether or not the payload data in the message should be stored in system level cache of the home node, and a 'priority' attribute 616 that indicates where in the system level cache the payload data should be stored. The message is updated with the destination 612 and attributes 614 and 616 and forwarded, via interconnect structure 104 to the destination 618. This mechanism acts as a predictor for the upcoming use of the incoming data by a core. In accordance with a further aspect of the disclosure, the predictor can be trained by the actual use of data through a feedback channel 620 from the caches into the routing and allocation logic 410. In one embodiment, when data stashed in a cache of a processing core is used by the core (this can be done tracking stashed lines), the cache sends a message 620 to I/O routing and allocation logic 410 to indicate that the stash was useful.

Likewise, when stashed data is evicted before being used, the cache can send a message 620 indicating that the stash was not useful. The I/O routing and allocation logic 410 can then adjust the thresholds for stashing closer to or further from the core and allocating closer or further from the MRU position accordingly, therefore stashing in a more or less aggressive manner.

The indicator of a location of a matching request in the message receive queue (RQ), may be used to determine when the matching request is urgent or not by comparing the location of the matching request to a location threshold. When the request is recent, it is likely that the data is less urgent and the data may be sent to a home node (HN) of the data processing system. A feedback message in the feedback channel that indicates actual usage of the payload data may be used to update the location threshold.

Figure 7:
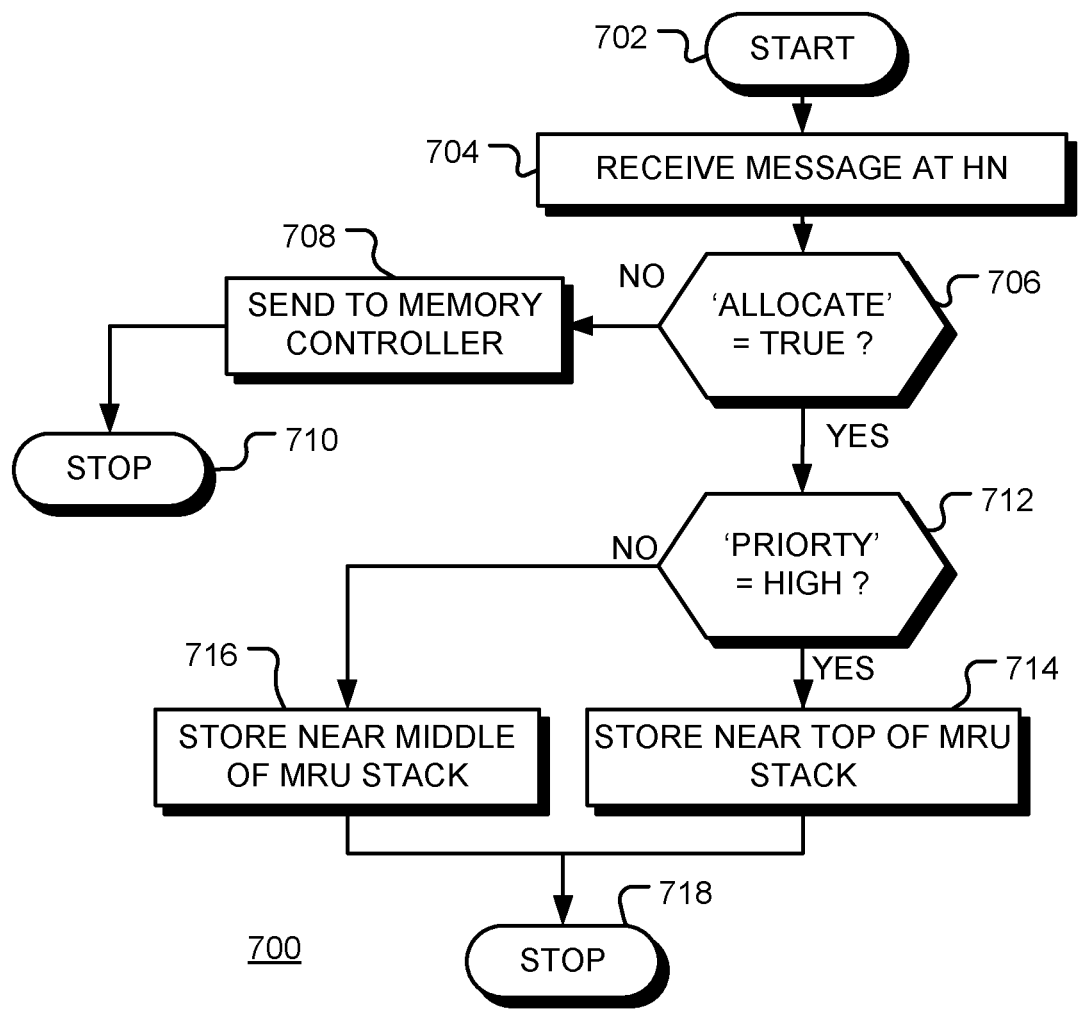
FIG. 7 is a flow chart of a method of operation of a home node, in accordance with embodiments of the disclosure.

FIG. 7 is a flow chart of a method 700 of operation of a home node, in accordance with embodiments of the disclosure. Following start block 702, a message, forwarded from an I/O interface, is received at the home node at block 704. At decision block 706, an 'allocate' attribute in the message is checked. When the 'allocate' attribute is not set to 'TRUE' as indicated by the negative branch from decision block 706, the payload data is sent, via the interconnect structure, to a memory controller at block 708 for storing in a memory, such as an off-chip memory for example. In one embodiment, writing to data to memory causes the HN to send the messages to invalidate copies of the data in the core or cluster private caches. If the system is cache coherent, all these actions will take place after or in parallel with the associated cache coherence actions. In this case, the incoming data is bypassed to memory, but the HN still sends invalidation messages. The method terminates at block 710. Conversely, when the 'allocate' attribute is set to 'TRUE' as indicated by the positive branch from decision block 706, the payload data is to be stored in a system level cache of the home node and flow continues to decision block 712. At decision block 712, the 'priority' attribute of the message checked. If the 'priority' attribute is set to 'HIGH', as depicted by the positive branch from decision block 712, the payload data is assigned a high priority in the system level cache at block 714. For example, data in the system level cache may be ordered depending on when it was most recently used (MRU). This may be implemented by maintaining a stack of data tags, for example. If the 'priority' attribute is set to 'LOW', as depicted by the negative branch from decision block 712, the payload data is stored with a lower priority in the system level cache at block 716. This increases the chance that the data will be evicted before being used, but reduces the chance of other useful data being evicted. The method terminates at block 718.

The replacement policy for data in the system level cache may be based on priorities. For example, a priority list or stack may be used. Other priority schemes include a least recently used (LRU) or pseudo-LRU policy, or the use of FIFO/LIFO queues to select victims on replacement. With all of the replacement schemes, data with high priority should be evicted later and data with low priority sooner. For example, in an LRU-based replacement policy, data is allocated closer to the MRU position for high priority and closer to the LRU position for low priority. In one embodiment, a victim cache is used as a backup for an SLC. The priority assigned to the data is used to influence whether the data is stored in the victim cache on eviction or not. A high priority message would be stored in the victim cache, and a low priority message would be sent directly to memory. It will be apparent to those of ordinary skill in the art that the low/high priority values may be used in various ways by the cache controller when managing the cache contents in general.

In an alternative embodiment, the 'priority' attribute may be a numerical value that is used by the home node to determine where to place the payload data in the system level cache.

A similar method may be used by the cache controller of a cache associated with a processing element to determine where payload data should be placed in a cache hierarchy, with higher priority data being placed closer to the processing core. For example, a cache controller may make the decision as to where, or even if, data should be stashed.

The mechanisms described above may be implemented using hardware, software or a combination thereof. The hardware implementations may be described by instructions of a hardware description language, for example. These instructions be stored on a computer readable medium and used to design application specific hardware. The instructions may also be used to configure a configurable circuit such as a field programmable gate array for example.

As used herein, the term processor, controller or the like may encompass a processor, controller, microcontroller unit (MCU), microprocessor, and other suitable control elements. It will be appreciated that embodiments of the invention described herein may be comprised of one or more conventional processors and unique stored program instructions that control the one or more processors to implement, in conjunction with certain non-processor circuits, some, most, or all of the functions described herein. The non-processor circuits may include, but are not limited to, a receiver, a transmitter, a radio, signal drivers, clock circuits, power source circuits, and user input devices. As such, these functions may be interpreted as a method to perform functions in accordance with certain embodiments consistent with the present invention. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Those skilled in the art will recognize that the present invention has been described in terms of exemplary embodiment. The present invention could be implemented using hardware component equivalents such as special purpose hardware and/or dedicated processors which are equivalents to the invention as described and claimed. Similarly, general purpose computers, microprocessor based computers, micro-controllers, optical computers, analog computers, dedicated processors and/or dedicated hard wired logic may be used to construct alternative equivalent embodiments of the present invention.

Moreover, those skilled in the art will appreciate that a program flow and associated data used to implement the embodiments described above can be implemented using various forms of storage such as Read Only Memory (ROM), Random Access Memory (RAM), Electrically Erasable Programmable Read Only Memory (EEPROM); nonvolatile memory (NVM); mass storage such as a hard disc drive, floppy disc drive, optical disc drive; optical storage elements, magnetic storage elements, magneto-optical storage elements, flash memory, core memory and/or other equivalent storage technologies without departing from the present invention. Such alternative storage devices should be considered equivalents.

Various embodiments described herein are implemented using dedicated hardware, configurable hardware or programmed processors executing programming instructions that are broadly described in flow chart form that can be stored on any suitable electronic storage medium or transmitted over any suitable electronic communication medium. A combination of these elements may be used. Those skilled in the art will appreciate that the processes and mechanisms described above can be implemented in any number of variations without departing from the present invention. For example, the order of certain operations carried out can often be varied, additional operations can be added or operations can be deleted without departing from the invention. Such variations are contemplated and considered equivalent.

Accordingly, some aspects and features of the disclosed embodiments are set out in the following numbered items:

1. A method for automatic routing of messages in a data processing system, the method comprising: receiving an incoming message at an input/output (I/O) interface of the data processing system, the incoming message comprising a message identifier and payload data; determining match information, where the match information comprises an indicator of whether the message identifier of the incoming message matches a message identifier of a message request in a message receive queue (RQ); and determining a destination, in the data processing system, for the incoming message dependent upon the match information; and forwarding the incoming message to the determined destination.

2. The method of item 1, where the determined destination comprises: a core-private cache, a cluster-private cache or a scratch pad of a processing element of the data processing system when the match information indicates a match between the identifier of the incoming message and an identifier of a message request in the RQ; and a home node (HN) of the data processing system when the match information indicates no match between the identifier of the incoming message and an identifier of a message request in the RQ.

3. The method of item 1, where determining the destination in the data processing system for the incoming message is further dependent upon a size of the payload data, and where the determined destination comprises: a home node (HN) of the data processing system when the payload data size exceeds a first size threshold.

4. The method of item 1, further comprising, when the determined destination of the incoming message is a home node of the data processing system: setting an 'allocate' attribute in the forwarded message to indicate whether the payload data should be stored in a system level cache of the home node or in a memory of the data processing system, where the 'allocate' attribute is set to indicate storage in the memory if a size of the payload data exceeds a first size threshold.

5. The method of item 1, where the match information further comprises an indicator of a location of a matching request in the message receive queue (RQ), where the determined destination comprises a cache of the data processing system, and where the method further comprises: setting a 'priority' attribute in the forwarded message to indicate where in the cache the payload data should be stored, where the 'priority' attribute is set dependent upon the location of the matching request in the RQ.

6. The method of item 1, where the match information further comprises an indicator of a location of a matching request in the message receive queue (RQ), and where determining the destination further comprises: determining when the matching request is recent by comparing the location of the matching request to a location threshold; and determining the destination to be a home node (HN) of the data processing system when the request is not recent.

7. The method of item 6, further comprising: sending a feedback message from the determined destination to indicate usage of the payload data; and updating the location threshold dependent upon the feedback message.

8. The method of item 1, where, when the determined destination comprises a cache of the data processing system, the method further comprises: setting a 'priority' attribute in the forwarded message to indicate where in the cache the payload data should be stored, where the 'priority' attribute is set dependent upon the whether the payload size exceeds a second size threshold.

9. The method of item 1, further comprising: determining the destination of the incoming message dependent upon whether the payload size exceeds a first size threshold; and when the determined destination comprises a cache, determining the location in the cache for storing the payload data dependent upon whether the payload size exceeds a second size threshold.

10. The method of item 9, further comprising: sending a feedback message from the determined destination to indicate usage of the payload data; and updating the first size threshold, the second size threshold, or both the first and second size thresholds dependent upon the feedback message.

11. The method of item 9, further comprising: setting an 'allocate' attribute in the forwarded message dependent upon whether the payload size exceeds the first size threshold; and setting a 'priority' attribute in the forwarded message dependent upon whether the payload size exceeds the second size threshold.

12. A method for automatic routing of messages in a data processing system, the method comprising: receiving an incoming message at an input/output (I/O) interface of the data processing system, the incoming message comprising a message identifier, payload data and a payload size; determining match information, where the match information comprises an indicator or whether the message identifier of the incoming message matches a message identifier of a message request in a message receive queue (RQ); determining a destination, in the data processing system, for the incoming message dependent upon the match information and the payload size; modifying the incoming message to include 'allocate' and 'priority' attributes when the determined destination is a home node of the data processing system; and forwarding the incoming message to the determined destination.

13. The method of item 12, further comprising: setting the 'allocate' attribute dependent upon a first payload size threshold; setting the 'priority' attribute dependent upon a second payload size threshold or dependent upon a location of a matching request in the RQ; and adjusting the first and second payload size thresholds dependent upon feedback from the determined destination.

14. A data processing system comprising: a plurality of data storage resources; an input/output (I/O) interface coupled to the plurality of data storage resources via an interconnect structure, the I/O interface capable of receiving a message incoming to the data processing system, the message comprising a message identifier and payload data; message queueing logic comprising a message receive queue (RQ) and message matching logic, the message queueing logic providing match information dependent upon the message identifier and information in the RQ; and routing logic that determines a destination, in the plurality of data storage resources, for the incoming message dependent upon the match information, where the incoming message is forwarded to the determined destination via the interconnect structure.

15. The data processing system of item 14, where the plurality of data storage resources comprise: one or more caches of a processing element of the data processing system; a system level cache of a home node (HN) of the data processing system; and a memory, accessible via a memory controller of the data processing system.

16. The data processing system of item 15, where the destination is determined to be a cache of a processing element when the identifier of the incoming message matches an identifier of a message in the RQ and a size of the payload data is below a first size threshold.

17. The data processing system of item 15, where the destination is determined to be the home node when the identifier of the incoming message does not match any identifier of a message in the RQ or a size of the payload data is above a first size threshold.

18. The data processing system of item 17, where the routing logic is configured to add an 'allocate' attribute to the message, and where the home node, dependent upon the 'allocate' attribute, either stores the payload data in the system level cache or forwards the payload data to the memory controller for storing in the memory.

19. The data processing system of item 15, where a processing element comprises a cache controller the enables cache stashing, whereby payload data routed to the processing element is stashed in a cache of the one or more caches of the processing element.

20. The data processing system of item 15, where a processing element comprises a scratchpad memory, and where payload data routed to the processing element is stored in the scratchpad memory.

21. The data processing system of item 14, where, when a request message for which the request message identifier matches the message identifier of the incoming message, the matching information comprises a position in the RQ and where the routing logic is further configured to set a value of a 'priority' attribute in the message forwarded to the determined destination dependent upon the position in the RQ.

22. The data processing system of item 14, where the routing logic is configured to receive feedback information from the determined destination, the feedback information indicative of the usage of the payload data.

23. The data processing system of item 14, where the message queueing logic further comprises a message send queue (SQ) and a message unexpected queue (UQ).

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. A method for automatic routing of messages, the method comprising:
   receiving an incoming message at an input/output (I/O) interface of a data processing system comprising a plurality of data processing elements and a home node, the incoming message comprising a message identifier and payload data, where the I/O interface the plurality of processing elements and the home node are intercoupled by an interconnect structure;
   determining match information, where the match information comprises an indicator of whether the message identifier of the incoming message matches a message identifier of a message request in a message receive queue (RQ); and
   when the match information indicates a match between the identifier of the incoming message and an identifier of a message request in the RQ and a size of the payload data is less than a first size threshold:
      determining a destination for the incoming message to be a cache of a first processing element of the plurality of processing elements that made the matching message request;
      forwarding the incoming message to the first processing element via the interconnect structure; and
      stashing the payload of the message in the cache of the first processing element; and
   when the match information indicates no match between the identifier of the incoming message and an identifier of a message request in the RQ:
      forwarding the incoming message to the home node via the interconnect structure;
   when the match information indicates a match between the identifier of the incoming message and an identifier of a message request in the RQ and the size of the payload data is not less than the first size threshold:
      determining the destination for the incoming message to be the home node;
      forwarding the incoming message to the home node via the interconnect structure;
      the home node storing the payload data of the incoming message to a system level cache of the home node or forwarding the payload data of the incoming message via the interconnect structure to a memory controller of the data processing system for storing in a shared memory of the data processing system, the shared memory uniformly accessible by the plurality of processing elements; and
      the home node acting as a point of coherence for the shared memory.

2. The method of claim 1, where the cache of the first processing element comprises:
   a core-private cache, a cluster-private cache or a scratch pad.

3. The method of claim 1, where stashing the payload of the incoming message in the cache of the first processing element comprises sending the payload to a cache controller of the first processing element.

4. The method of claim 1, further comprising, when the determined destination of the incoming message is the home node of the data processing system:
   setting an 'allocate' attribute in the forwarded message to 'true' when the size of the payload data exceeds a second size threshold;
   the home node forwarding the payload data to the memory controller, via the interconnect structure, for storing in the shared memory of the data processing system when the 'allocate' attribute is set to 'true'; and the home node storing the payload data in the system level cache of the home node when the 'allocate' attribute is not set to 'true'.

5. The method of claim 1, further comprising
storing message identifiers of receive requests in the RQ in accordance with ordering rules;
determining the location, within the RQ, of a message identifier of a receive request that matches the message identifier of the incoming message;
setting an indicator of the location in the match information;
setting a 'priority' attribute in the forwarded message based on the indicator of the location; and
storing the payload data of the forwarded message in a cache of the data processing system with a priority determined by the 'priority' attribute.

6. The method of claim 1, where the match information further comprises an indicator of a location of a matching request in the message receive queue (RQ), and where determining the destination further comprises:
determining when the matching request is urgent by comparing the location of the matching request to a location threshold; and
determining the destination to be the home node (HN) of the data processing system when the request is not urgent.

7. The method of claim 6, further comprising:
sending a feedback message from the first processing element to indicate usage by the first processing element of the payload data routed to the first processing element; and
updating the location threshold dependent upon the feedback message.

8. The method of claim 1, where, when the determined destination comprises the system level cache of the data processing system, the method further comprises:
setting a 'priority' attribute in the forwarded message to indicate where in the cache the payload data should be stored,
where the 'priority' attribute is set dependent upon whether the payload size exceeds a second size threshold.

9. The method of claim 1, further comprising:
when the determined destination comprises a cache, determining a location in the cache for storing the payload data dependent upon whether the payload size exceeds a second size threshold.

10. The method of claim 9, further comprising:
determining usage of the payload data by the first processing element; and
updating the first size threshold, the second size threshold, or both the first and second size thresholds dependent upon the usage of the payload data.

11. The method of claim 9, further comprising:
setting an 'allocate' attribute in the forwarded message dependent upon whether the payload size exceeds the first size threshold;
setting a 'priority' attribute in the forwarded message dependent upon whether the payload size exceeds the second size threshold;
when 'allocate' attribute is set to 'true', the home node allocating space in the system level cache and storing the payload data in the allocated space in system level cache in accordance with the 'priority' attribute.

12. A method for automatic routing of messages comprising:
receiving an incoming message at the I/O interface of a data processing system comprising a plurality of data processing elements and a home node coupled via an interconnect structure, the incoming message comprising a message identifier, payload data and a payload size;
determining, by the I/O interface, match information, where the match information comprises an indicator of whether the message identifier of the incoming message matches a message identifier of a message request in a message receive queue (RQ);
determining a cache of a first processing element of the plurality of processing elements as a destination for the incoming message when the match information indicates a match between the identifier of the incoming message and an identifier of a message request in the RQ and a size of the payload data is less than a first size threshold;
determining the home node as a destination, in the data processing system, for the incoming message when the match information indicates a match between the identifier of the incoming message and an identifier of a message request in the RQ and the size of the payload data is not less than the first size threshold;
determining the home node as a destination, in the data processing system, for the incoming message when the match information indicates no match between the identifier of the incoming message and an identifier of a message request in the RQ;
when the determined destination is the home node:
modifying the incoming message to include 'allocate' and 'priority' attributes;
forwarding the incoming message to the home node;
the home node storing the payload data of the incoming message in a shared memory of the data processing system when the 'allocate' attribute is not set to 'true';
the home node storing the payload data of the incoming message in a system level cache of the home node when the 'allocate' attribute is set to 'true'; and
the home node acting as a point of coherence for the shared memory; and
when the determined destination is the first processing element:
forwarding the incoming message to the first processing element via the interconnect structure.

13. The method of claim 12, further comprising:
setting the 'allocate' attribute dependent upon a second payload size threshold;
setting the 'priority' attribute dependent upon a third payload size threshold or dependent upon a location of a matching request in the RQ; and
adjusting the second and third payload size thresholds dependent upon feedback from the determined destination.

14. A data processing system comprising:
an interconnect structure;
a plurality of processing elements each comprising a cache and a cache stashing mechanism;
a home node that acts as a point of coherence for a shared memory, where the home node is coupled to the plurality of processing elements and the shared memory via the interconnect structure and where the shared memory is uniformly accessible by the plurality of processing elements;
an input/output (I/O) interface coupled to the plurality of processing elements and the home node via the interconnect structure, the I/O interface capable of receiving a message incoming to the data processing system, the message comprising a message identifier and payload data:

message queueing logic comprising a message receive queue (RQ) and message matching logic, the message matching logic providing match information dependent upon the message identifier and information in the RQ; and routing logic configured to determine a destination for the incoming message dependent upon the match information and forward the incoming message to the determined destination via the interconnect structure, where the routing logic is further configured to:

route the incoming message to the cache of a first processing element of the plurality of processing elements using the cache stashing mechanism of the first processing element when the match information indicates a match between the identifier of the incoming message and an identifier of a message request in the RQ from the first processing element and a size of the payload data is less than a first size threshold, route the incoming message to the home node when the match information indicates a match between the identifier of the incoming message and an identifier of a message request in the RQ and the size of the payload data is not less than the first size threshold, and route the incoming message to the home node when the match information indicates no match between the identifier of the incoming message and an identifier of a message request in the RQ, and where the home node is configured to forward the payload data to a system level cache or to forward the payload data, via the interconnect structure, to a memory controller of the data processing system for storing in the shared memory of the data processing system.

15. The data processing system of claim 14, where the routing logic is further configured to add an 'allocate' attribute to message when the message is routed to the home node, the data processing system further comprising:

the system level cache; and the shared memory, accessible by the plurality of processing elements via the memory controller of the data processing system, where the home node is configured to forward payload data of the message to the system level cache or to the memory controller for storing in the shared memory dependent, at least in part, on the 'allocate' attribute of the message.

16. The data processing system of claim 15, where the first processing element comprises a cache controller that enables cache stashing, whereby payload data routed to the cache of the first processing element is stashed, by the cache controller, in the cache of the first processing element.

17. The data processing system of claim 15, where the first processing element comprises a scratchpad memory, and where payload data routed to the first processing element is stored in the scratchpad memory.

18. The data processing system of claim 14, where, when a request message for which the request message identifier matches the message identifier of the incoming message, the matching information comprises a position in the RQ and where the routing logic is further configured to set a value of a 'priority' attribute in the message forwarded to the determined destination dependent upon the position in the RQ.

19. The data processing system of claim 14, where the routing logic is configured to receive feedback information from the first processing element, the feedback information indicative of the usage of the payload data by the first processing element.

20. The data processing system of claim 14, where the message queueing logic further comprises a message send queue (SQ) and a message unexpected queue (UQ).

* * * * *